D. BANKS, Jr.
Improvement in Friction-Clutch and Brake.
No. 131,207. Patented Sep. 10, 1872.
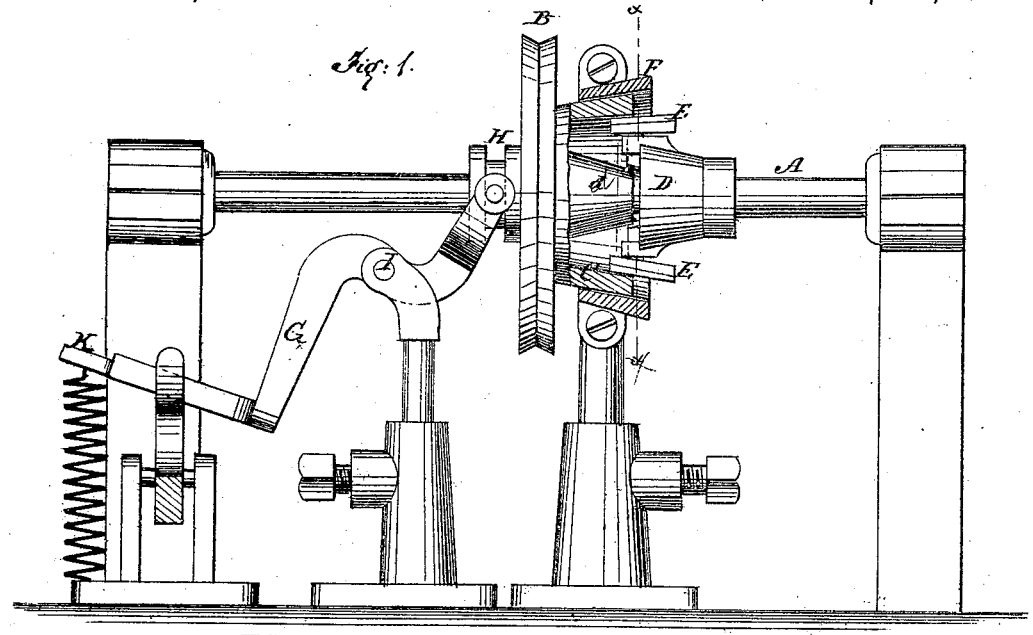
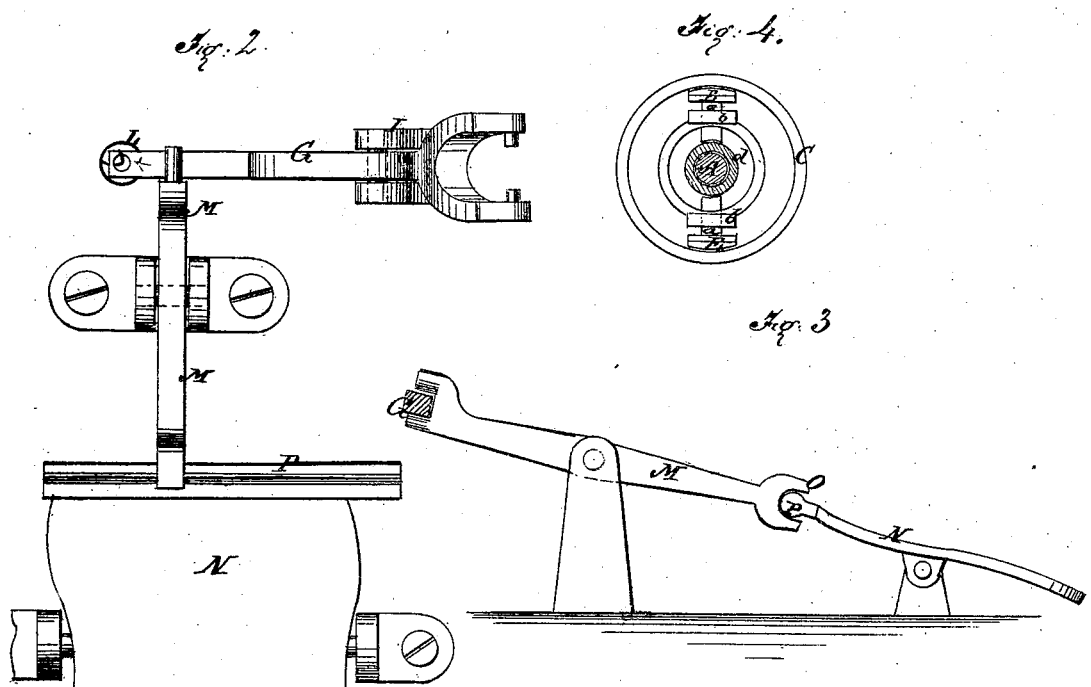

UNITED STATES PATENT OFFICE.

DARIUS BANKS, JR., OF MIDDLETOWN, CONNECTICUT.

IMPROVEMENT IN FRICTION CLUTCHES AND BRAKES.

Specification forming part of Letters Patent No. 131,207, dated September 10, 1872.

Specification describing a new and Improved Friction-Clutch and Brake, invented by DARIUS BANKS, Jr., of Middletown, in the county of Middlesex and State of Connecticut.

My invention consists of a loose wheel on the driving-shaft with a hollow conical hub, which is engaged with a friction-hub on the shaft by sliding in one direction to set the wheel in motion, and when moved in the other direction to disconnect it from the hub it is engaged with a stationary friction-brake to stop it, the hub acting on the inside of the said hollow conical hub and the brake on the outside, said brake being in the form of a hoop or band surrounding the said hollow hub of the wheel. The invention also consists of friction blocks or pads on the hub, which is keyed fast to the shaft, for acting upon the said hollow hub of the pulley, which are capable of a slight radial movement, and a cone on the pulley within its hollow hub, which comes against the inner ends of arms of said pads at the time the pulley is shifted to be set in motion and forces the said pads out against the inner wall of the hollow cone. These devices are to be used as auxiliary to the hollow cone, and the one acting with it to clutch the wheel to the shaft for increasing the frictional capacity of the clutch, but may be dispensed with, as good results are obtained by a hub, D, without the pads acting directly on the hub C. When they are used the inner wall of the hollow cone of the pulley may be made cylindrical instead of conical, if preferred. The wheel is shifted on the shaft in one direction by a foot-treadle and suitable connecting-levers, and in the other direction by a spring. This foot-treadle and the lever by which the motion is transmitted from the treadle to the wheel-shifter are connected in a novel manner, by which the treadle may be shifted laterally along the lever as much as the width of the treadle to allow of adjusting the treadle to suit the convenience of the operator. This device also constitutes a part of the invention.

Figure 1 is partly a side elevation and partly a sectional elevation of my improved friction-clutch and brake. Fig. 2 is a plan view of the treadle and wheel-shifting apparatus. Fig. 3 is a side elevation of the treadle and connecting-lever, and Fig. 4 is a section on the line $x\,x$ of Fig. 1.

Similar letters of reference indicate corresponding parts.

A represents a driving-shaft, to be kept constantly running, say, under a long bench or table, whereon a number of sewing-machines are mounted as in shirt and other garment factories, each to be driven by a pulley, B, on said shaft, which it is desirable to stop and start as quickly as possible to economize time, the machine having to be stopped so often in the regular progress of the work that a brief period of time being lost at each stoppage amounts to a large aggregate. The pulleys B are therefore arranged loosely on the shaft to allow them to be stopped while the shaft continues to run; also, to allow them to be shifted along the shaft for engaging and disengaging the clutch and brake. To one side of this pulley I attach a hollow and slightly conical hub, C, and in front of this I arrange a hub, D, on the shaft, keyed fast to it, which hub, together with the inner wall of hub C, constitutes the friction-clutch for engaging and turning the pulley when the latter is moved toward hub D, so that the friction pads or blocks E on hub D wedge into hub C to bind it fast. These pads consist of iron plates or blocks faced on the sides, which act on the hub C, with leather, and they are connected to the hub D by the stems $a$ passing radially through projections $b$ of the hub, so that they can move forward and back to some extent. The inner ends of these stems are suitably shaped and relatively arranged with a conical hub, $d$, of the pulley within the hollow hub C, to be forced outward by said cone when the pulley is moved toward the hub D to force the pads against the inner wall of C, thereby greatly increasing the frictional power of the clutch; but I propose to use these movable pads and the cone $d$, or not, as I may prefer. By having these pads movable in this way I may also arrange them to have sufficient lateral movement, by having the holes for the stems sufficiently large to insure their bearing flat upon the surface of cone C throughout their whole surface. The friction-block D is so arranged relatively to the hub C that the pulley will only have to be moved slightly on the shaft to engage or disengage them. F is a hollow and slightly conical band or ring, surrounding the hollow hub C, and so adjusted relatively thereto and to the friction-block D that the movement of the pulley to disengage it from the block D brings the exterior surface of hub C in contact with the inner wall of F, so that it, being fixed to a permanent support, becomes a brake for instantly stopping the pulley, and the movement of the pulley in the direction to engage it with hub D disengages it from the brake, thus bringing the brake into action, and instantly stopping the pulley by the same movement by which it is disconnected from the clutch, and engaging it with the clutch by the same movement that disengages it from the brake. If the conical hub C be made largest next to the wheel and smallest at the outer end the friction-block D and the brake may be reversed as to their inclinations and the results produced will be the same. For effecting these movements of the pulley I use a crotched bell-crank, G, connected with the grooved hub H of the pulley, pivoted to a stand at its elbow I, and connected at its free end K to the floor by a spring, L, which constantly tends to shift the pulley out of gear with the block D and into connection with the brake F, and said cranked lever G is connected by a lever, M, with a foot-treadle, N, under the table, in such manner that the treadle being pushed down forces the pulley into connection with the clutch-block D, and extends the spring L ready to pull the pulley back as soon as the operator lifts his feet from the treadle and allows the spring to act. I may, however, dispense with the spring and use the treadle for moving the pulley in both directions. The connection of the pulley with the clutch-block is maintained by the holding of the treadle in this position by the operator. I make the connection of the treadle with this lever M by having a notch, O, in the end of the lever, and a bead or rib, P, on the edge of the treadle, extending its whole length, and entering the notch O, so that the connection will be maintained at any point along the treadle, thus allowing it to be shifted laterally along the lever as may be required to suit the convenience of the operator, whose seat will necessarily be arranged relatively to the sewing-machine on the bench, so as to require such relative arrangement of the treadle to it that a connection of the lever M to the treadle at any one particular point would not, unless great care be taken to determine the position of the said point of connection, bring the treadle in the right relation to the seat, and even then it could not be adjusted to suit different operators, which is highly desirable.

Having thus described my invention, I claim as new, and desire to secure by Letters Patent—

1. The combination of the loose and sliding pulley B, having a hollow conical hub, C, with a friction-block, D, on the driving-shaft, and a stationary friction band or brake, F, substantially as specified.

2. The combination of the friction-cone $d$ and movable pads E, with the hub D and hollow hub C, whether the latter be made conical or cylindrical on its inner wall, substantially as specified.

3. The connection of the foot-treadle with the transmitting lever M by the edge of the treadle entering the notch in the end of the lever, substantially as specified.

DARIUS BANKS, Jr.

Witnesses:
JOHN W. CROWELL,
SAMUEL STEANS, Jr.